United States Patent
Silva

(10) Patent No.: US 10,421,514 B2
(45) Date of Patent: *Sep. 24, 2019

(54) RACK FOR BICYCLE AND BICYCLE WITH RACK

(71) Applicant: 3G BIKES LLC, Whittier, CA (US)

(72) Inventor: Gary Silva, Whittier, CA (US)

(73) Assignee: 3G BIKES, LLC, Whittier, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,755

(22) Filed: Jan. 8, 2018

(65) Prior Publication Data
US 2018/0257725 A1 Sep. 13, 2018

Related U.S. Application Data

(63) Continuation of application No. 14/880,097, filed on Oct. 9, 2015, now Pat. No. 9,862,444.

(60) Provisional application No. 62/062,050, filed on Oct. 9, 2014.

(51) Int. Cl.
*B62J 9/00* (2006.01)
*B62J 11/00* (2006.01)
*B62K 7/04* (2006.01)

(52) U.S. Cl.
CPC ............ *B62J 9/001* (2013.01); *B62J 11/00* (2013.01); *B62K 7/04* (2013.01)

(58) Field of Classification Search
CPC ....... B62J 7/00; B62J 7/04; B62J 9/001; B62J 11/00; B62K 19/40
USPC ....... 224/400, 412, 416, 419, 422, 427, 451, 224/452, 458, 533
See application file for complete search history.

(56) References Cited

U.S. PATENT DOCUMENTS

| | | | | | |
|---|---|---|---|---|---|
| 1,044,867 | A | * | 11/1912 | Breuil | B62J 7/04 224/413 |
| 2,776,790 | A | * | 1/1957 | Zbikowski | B62J 7/02 224/413 |
| 3,901,534 | A | * | 8/1975 | Popken | B62J 1/20 224/413 |
| 3,921,868 | A | * | 11/1975 | Reichbach | B62J 9/00 224/425 |
| 4,244,496 | A | * | 1/1981 | Litz | B62J 11/00 224/413 |

(Continued)

FOREIGN PATENT DOCUMENTS

| CN | 203047429 | * | 7/2013 |
|---|---|---|---|
| CN | 203078658 | * | 7/2013 |

(Continued)

*Primary Examiner* — Joseph M Rocca
*Assistant Examiner* — Maurice L Williams
(74) *Attorney, Agent, or Firm* — Knobbe, Martens, Olson & Bear, LLP

(57) ABSTRACT

A rack for a bicycle or a bicycle with a rack comprises a rack body configured to be supported above a rear wheel of the bicycle. The rack body can be supported by side portions that extend along and straddle the rear wheel and are coupled to the bicycle. The rack can comprise a deck portion that extends in a longitudinal direction of the bicycle above the rear wheel. One or more carrier arms can be coupled to the rack at forward and/or rearward ends. In some configurations, a carrier arm can be provided on each side of the front and rear of the rack. The carrier arms can be rotatable or otherwise adjustable with respect to the rack body.

22 Claims, 14 Drawing Sheets

(56) References Cited

U.S. PATENT DOCUMENTS

| | | | | |
|---|---|---|---|---|
| 5,217,149 | A * | 6/1993 | Simonett | B62J 7/02 224/446 |
| 5,257,727 | A * | 11/1993 | Chen | B62J 7/04 224/424 |
| 5,603,440 | A * | 2/1997 | Barro | B62J 7/04 224/441 |
| 5,639,001 | A * | 6/1997 | Brady | B62J 11/00 224/416 |
| 5,655,696 | A * | 8/1997 | Simonett | B62J 7/04 224/452 |
| 5,664,715 | A * | 9/1997 | Gogan | B62J 7/04 224/413 |
| 5,687,894 | A * | 11/1997 | Cavallaro | B62J 11/00 224/448 |
| 5,803,329 | A * | 9/1998 | Weissenberger | B62J 7/04 224/422 |
| 5,816,462 | A * | 10/1998 | Brantley | B60R 9/00 224/570 |
| 6,527,153 | B1 * | 3/2003 | Manos | B62J 7/00 224/427 |
| 7,273,221 | B2 * | 9/2007 | Ockenden | B62J 7/02 224/422 |
| 9,187,142 | B2 * | 11/2015 | McKenzie | B62J 7/04 |
| 9,387,898 | B2 * | 7/2016 | Ponder | B62J 7/00 |
| 2005/0023313 | A1 * | 2/2005 | Yaczkanich | B60R 9/02 224/401 |
| 2005/0254920 | A1 * | 11/2005 | Baughman | B60B 7/004 411/372.5 |
| 2007/0051567 | A1 * | 3/2007 | Matsueda | B62L 1/005 188/24.22 |
| 2009/0194569 | A1 * | 8/2009 | Bennison | B62J 7/04 224/426 |
| 2010/0224662 | A1 * | 9/2010 | Crum, Jr. | B62J 7/04 224/419 |
| 2013/0292438 | A1 * | 11/2013 | Armstrong | B62J 7/08 224/447 |
| 2014/0091120 | A1 * | 4/2014 | Thompson | B62J 9/001 224/413 |

FOREIGN PATENT DOCUMENTS

| | | | | |
|---|---|---|---|---|
| DE | 2945909 | A1 * | 5/1981 | B62J 7/00 |
| DE | 29701248 | U1 * | 5/1997 | B62J 7/04 |
| DE | 202009013632 | | * 4/2010 | |
| JP | 2000289671 | A | * 10/2000 | |
| KR | 439198 | | * 11/2006 | |

* cited by examiner

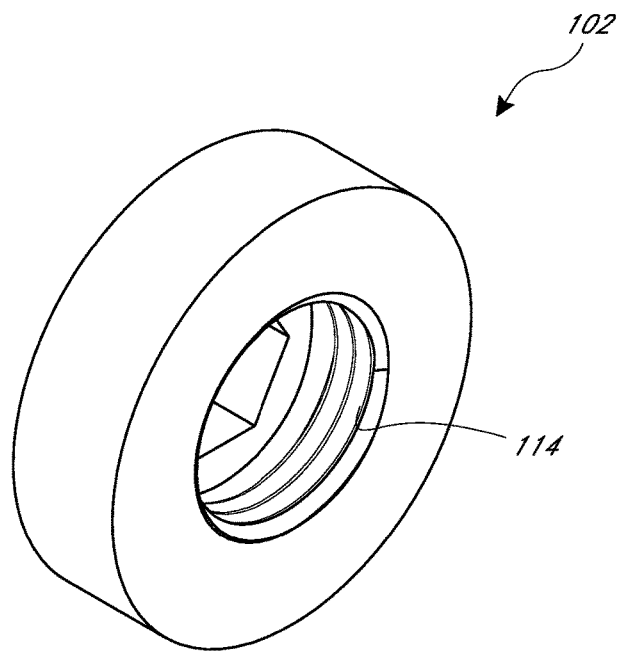
FIG. 15
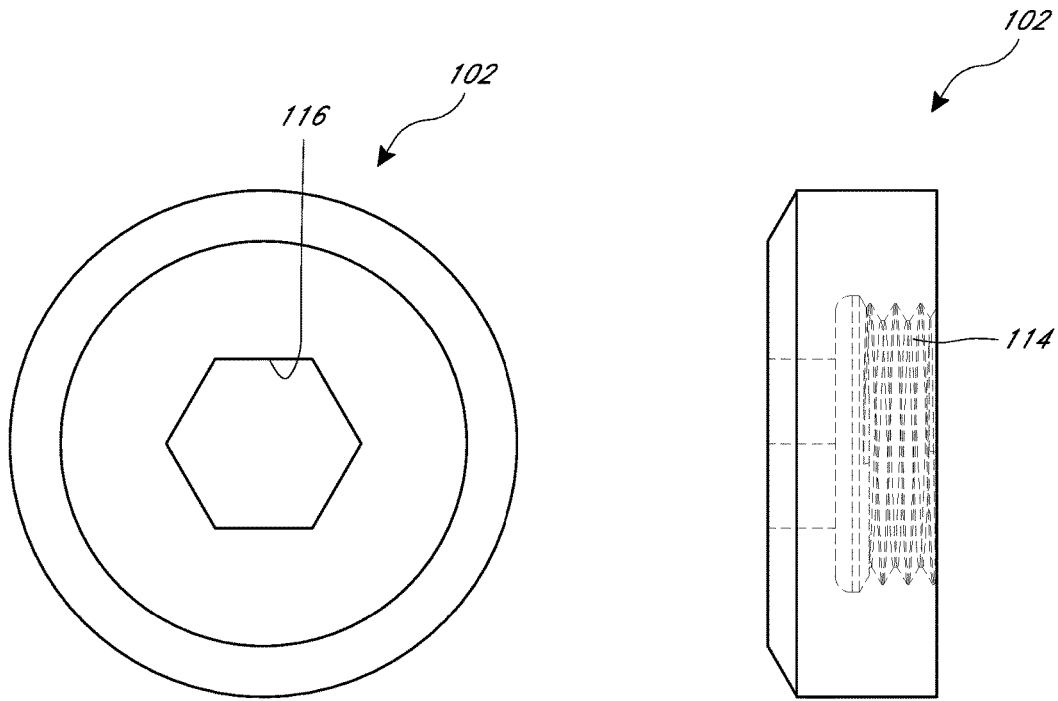
FIG. 16
FIG. 17

RACK FOR BICYCLE AND BICYCLE WITH RACK

INCORPORATION BY REFERENCE TO ANY PRIORITY APPLICATIONS

Any and all applications for which a foreign or domestic priority claim is identified in the Application Data Sheet as filed with the present application are hereby incorporated by reference herein and made a part of the present disclosure.

BACKGROUND

Field

The present invention relates generally to bicycles and, in particular, to a rack for a bicycle or a bicycle with a rack.

Description of Related Art

Racks are often used with bicycles to carry objects. The racks often are positioned above the front wheel or the rear wheel of the bicycle. However, a need exists for improved rack designs that fit a wider variety of bicycles, are more easily or quickly adjusted, allow more or different types of cargo to be carried, or simply provide the public with a useful choice.

SUMMARY

The systems, methods and devices described herein have innovative aspects, no single one of which is indispensable or solely responsible for their desirable attributes. Without limiting the scope of the claims, some of the advantageous features will now be summarized.

A rack for a bicycle or a bicycle with a rack comprises a rack body configured to be supported above a rear wheel of the bicycle. The rack body can be supported by side portions that extend along and straddle the rear wheel and are coupled to the bicycle frame. The rack can comprise a deck portion that extends in a longitudinal direction of the bicycle above the rear wheel.

One or more carrier arms can be coupled to the rack at forward and/or rearward ends. In some configurations, a carrier arm can be provided on each side of the front and rear of the rack. The carrier arms can be rotatable or otherwise adjustable with respect to the rack body. This feature allows a distance and/or a height between front and rear carrier arms to be adjusted. In some configurations, the carriers arms comprise a cradle that allows boards or board-like objects (e.g., surfboards, stand-up paddle boards, skateboards, etc.) to be carried.

In some configurations, the rack can support an umbrella holder or an integrated umbrella. The umbrella holder can be supported on the deck of the rack.

In some configurations, the forward end of the rack can be coupled to the seat post, seat tube or other portion of the bicycle frame by an adjustable connector. The adjustable connector can be rotatable relative to the forward end of the rack. The adjustable connector can have a clamp that is rotatable relative to a main body or arm portion of the adjustable connector. With such an arrangement, the adjustable connector can be fit to a wide variety of bicycle types, sizes or geometries.

In some configurations, a bicycle rack comprises a rack body configured to be supported above a wheel of the bicycle. A pair of side portions is configured to extend along and straddle opposite sides of the wheel of the bicycle. Each of the pair of side portions is coupled to the bicycle. A deck portion is configured to extend in a longitudinal direction of the bicycle above the wheel. A first set of carrier arms is coupled to a side of the rack body and a second set of carrier arms is coupled to an opposite side of the rack body. At least one of each of the first set of carrier arms and the second set of carrier arms is adjustable relative to the rack body.

In some configurations, each of the first set and the second set of carrier arms comprises an individual carrier arm at each of a forward end and a rearward end of the rack body.

In some configurations, the adjustable carrier arms are rotatable with respect to the rack body.

In some configurations, the adjustable carrier arms are movable between a plurality of discrete adjustment positions.

In some configurations, the adjustable carrier arms are movable between the plurality of discrete adjustment positions without the use of tools.

In some configurations, each of the individual carrier arms of at least one of the first and second set of carrier arms comprise a U-shaped cradle.

In some configurations, the rack body supports an umbrella holder.

In some configurations, the umbrella holder is supported on an upper surface of the deck.

In some configurations, the rack body supports an umbrella.

In some configurations, an adjustable connector is configured to connect a forward end of the rack to a seat post, a seat tube or another portion of the bicycle.

In some configurations, the adjustable connector is rotatable relative to the forward end of the rack.

In some configurations, each of the side portions is connectable to an axle of the bicycle by a bracket, further comprising an axle nut and an end cap, wherein the end cap is connectable to the axle nut to capture the bracket between the axle nut and the end cap.

In some configurations, a bicycle comprises a bicycle frame supporting a front wheel and a rear wheel. A handlebar is configured to steer the front wheel. The bicycle includes a seat. A rack body is configured to be supported above the rear wheel of the bicycle. A pair of side portions is configured to extend along and straddle opposite sides of the rear wheel of the bicycle. Each of the pair of side portions is coupled to the bicycle. A deck portion is configured to extend in a longitudinal direction of the bicycle above the rear wheel. A first set of carrier arms is coupled to a side of the rack body and a second set of carrier arms is coupled to an opposite side of the rack body. At least one of each of the first set of carrier arms and the second set of carrier arms is adjustable relative to the rack body.

In some configurations, the adjustable carrier arms are rotatable with respect to the rack body.

In some configurations, the adjustable carrier arms are movable between a plurality of discrete adjustment positions.

In some configurations, each of the individual carrier arms of at least one of the first and second set of carrier arms comprise a U-shaped cradle.

In some configurations, the rack body supports an umbrella.

In some configurations, the umbrella is configured to extend from the handlebar to a location vertically above the rear wheel of the bicycle.

In some configurations, an adjustable connector is configured to connect a forward end of the rack to a seat post, a seat tube or another portion of the bicycle.

In some configurations, each of the side portions is connectable to an axle of the rear wheel of the bicycle by a bracket, further comprising an axle nut and an end cap, wherein the end cap is connectable to the axle nut to capture the bracket between the axle nut and the end cap.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

FIG. 15 is a perspective view of an end cap for the replacement axle nut of FIG. 9.

FIG. 16 is an end view of the end cap of FIG. 15.

FIG. 17 is a side view of the end cap of FIG. 15.

DETAILED DESCRIPTION

Figure 1:
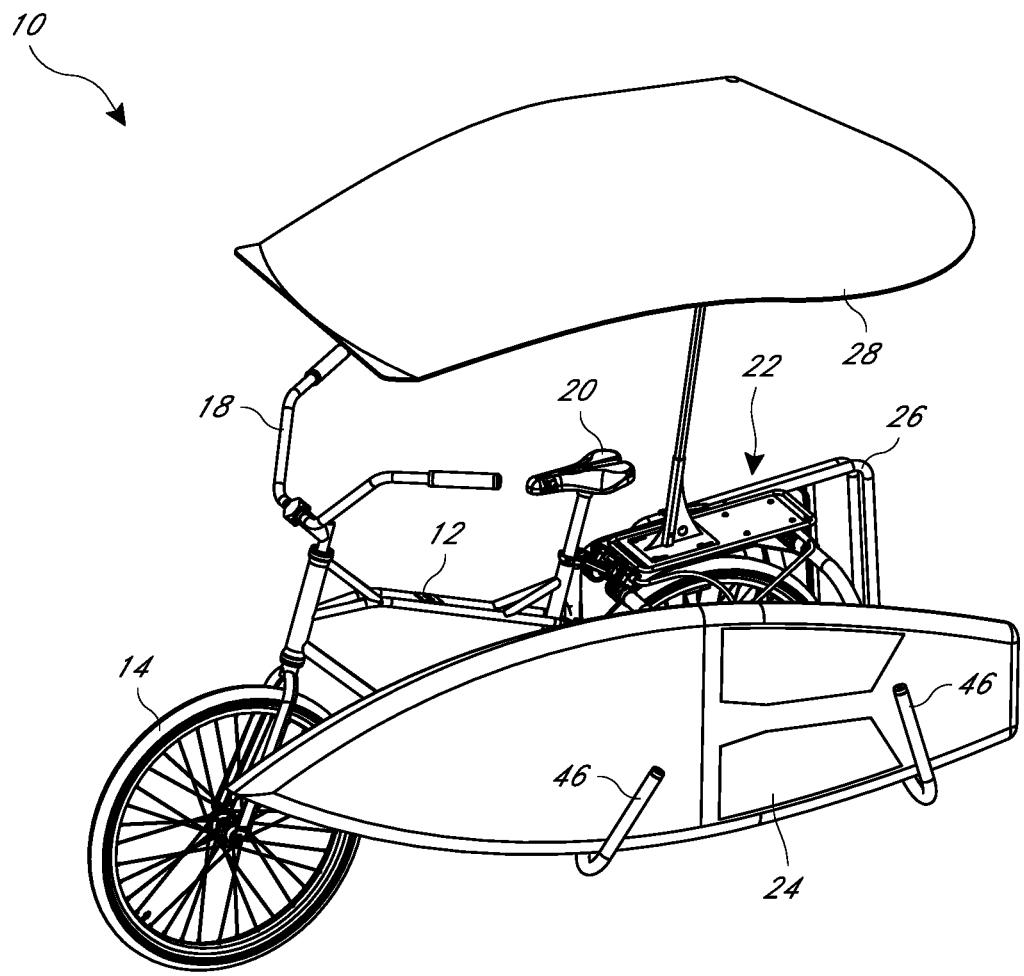
FIG. 1 is a side and top perspective view of a bicycle incorporated a rack having certain features, aspects and advantages of the preferred embodiments.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 2:
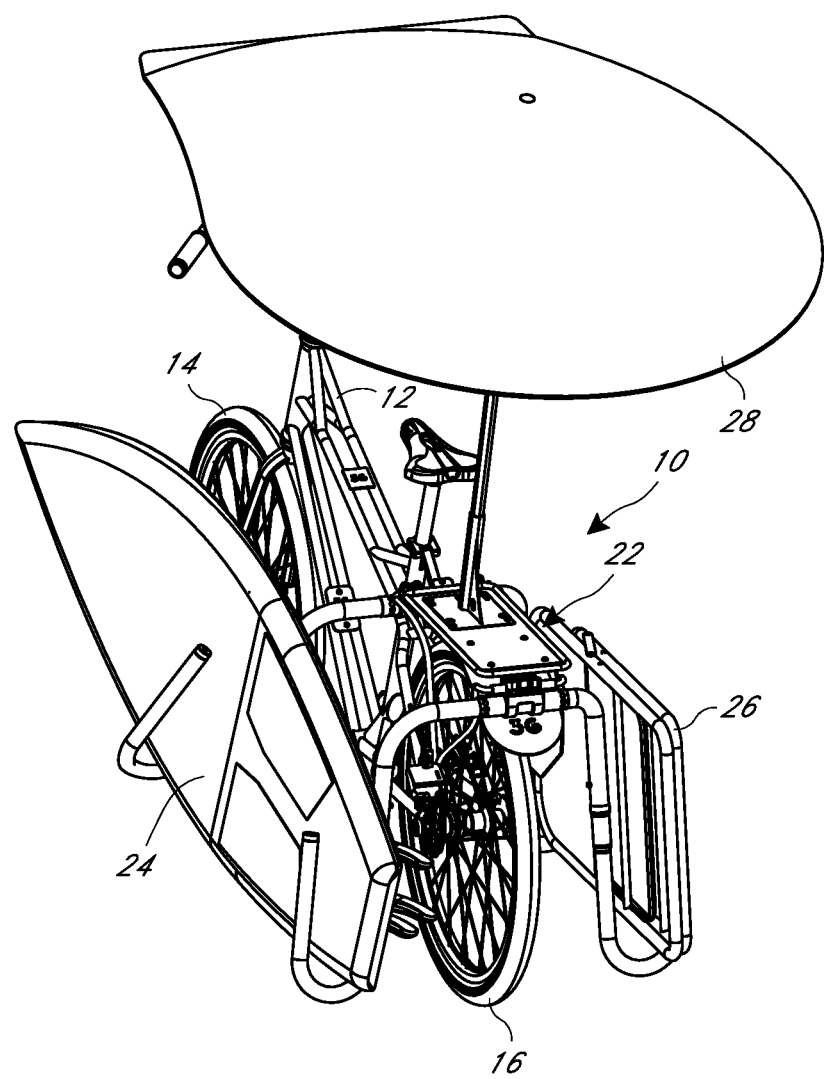
FIG. 2 is a side, rear and top perspective view of the bicycle with rack of FIG. 1.
Figure 3:
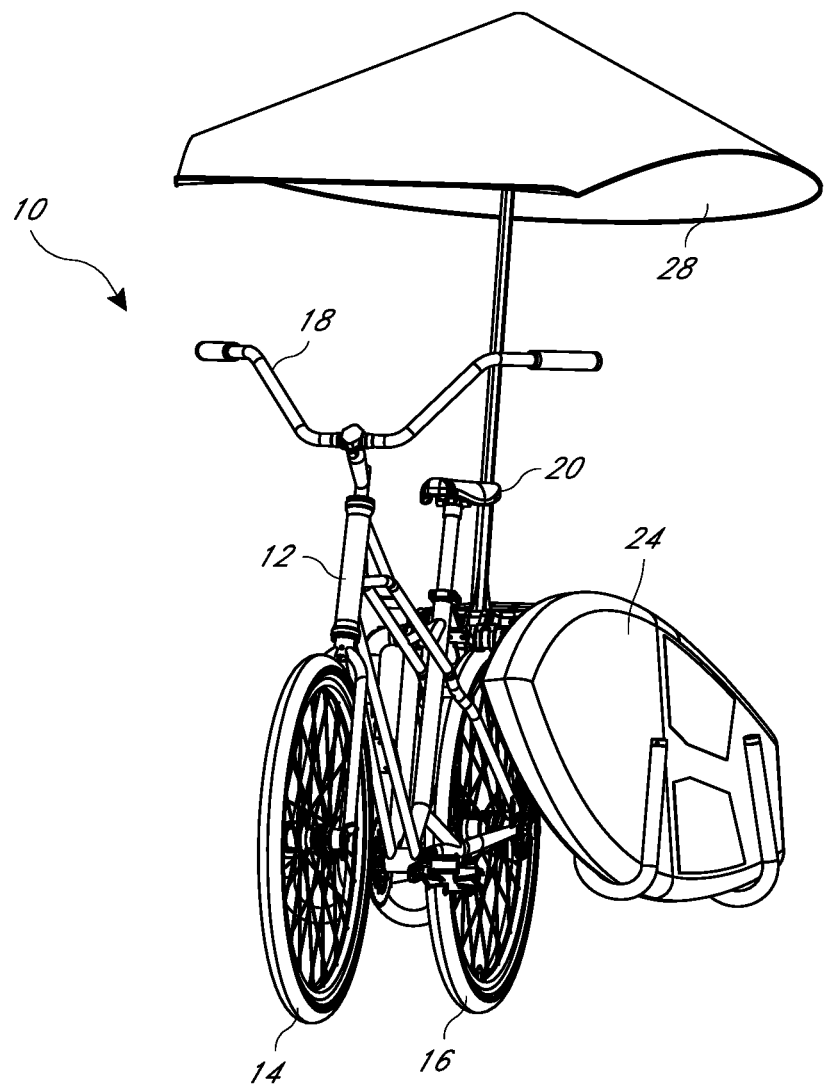
FIG. 3 is a side, front and bottom perspective view of the bicycle with rack of FIG. 1.
Figure 4:
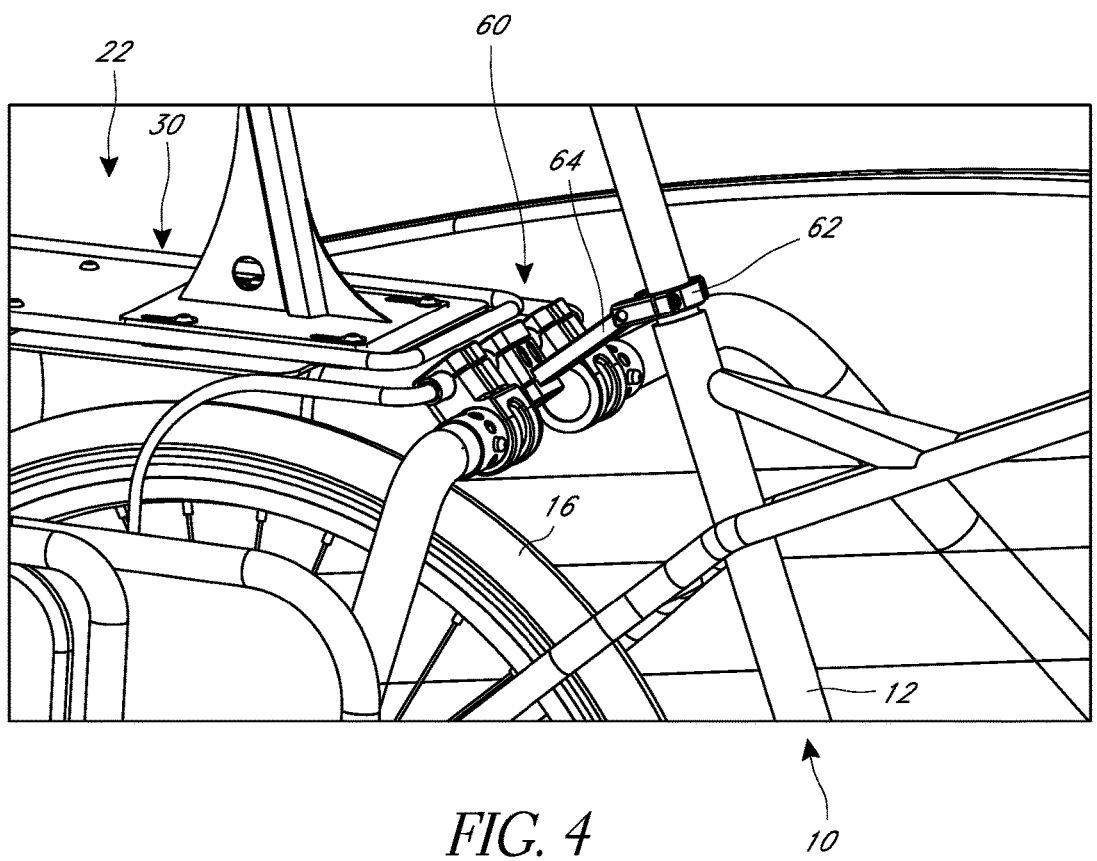
FIG. 4 is an enlarged view of a forward portion of the bicycle with rack of FIG. 1.
Figure 5:
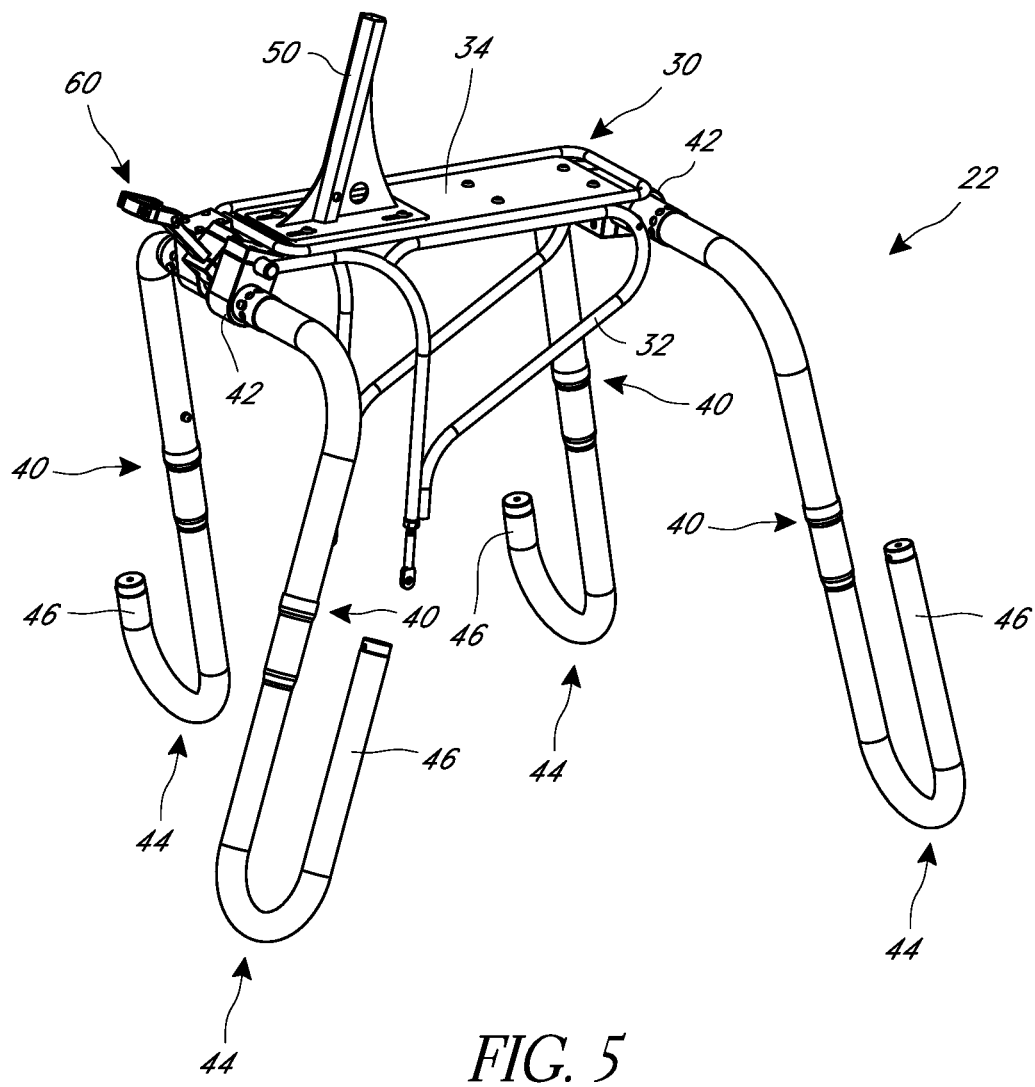
FIG. 5 is a perspective view of the rack of FIG. 1 separate from the bicycle.
Figure 6:
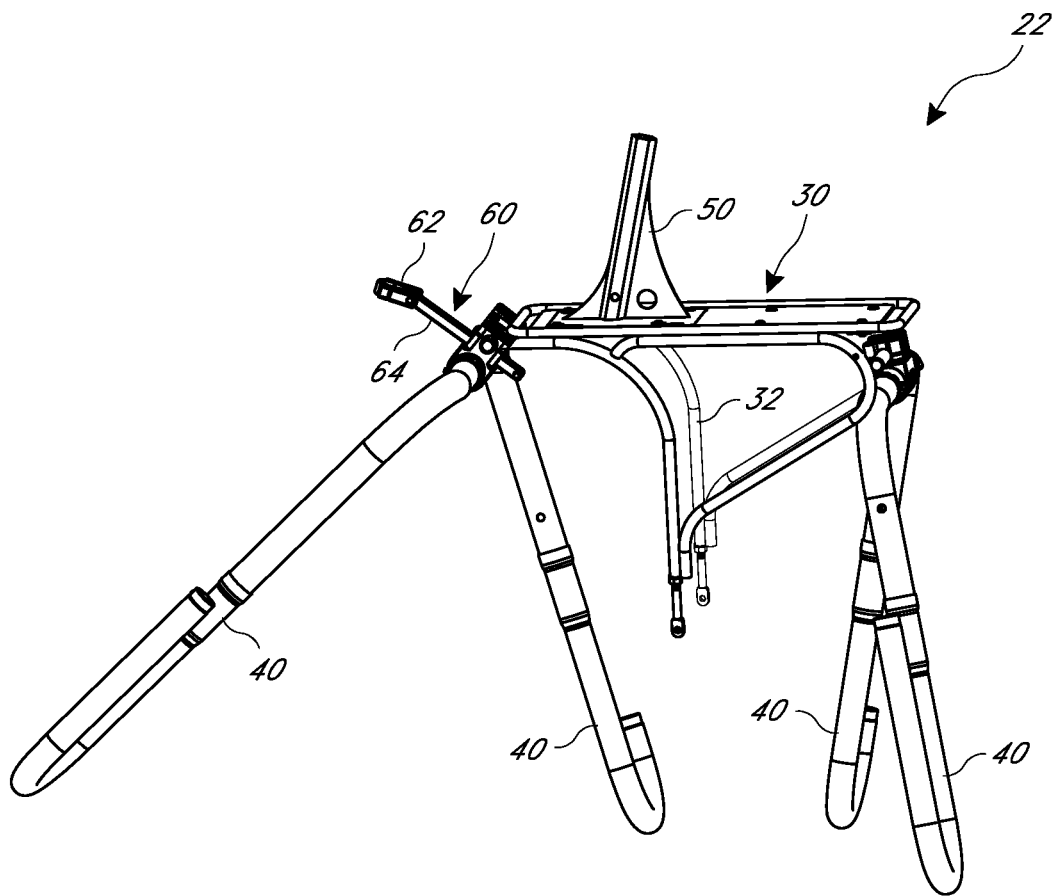
FIG. 6 is a side view of the rack of FIG. 5.
Figure 7:
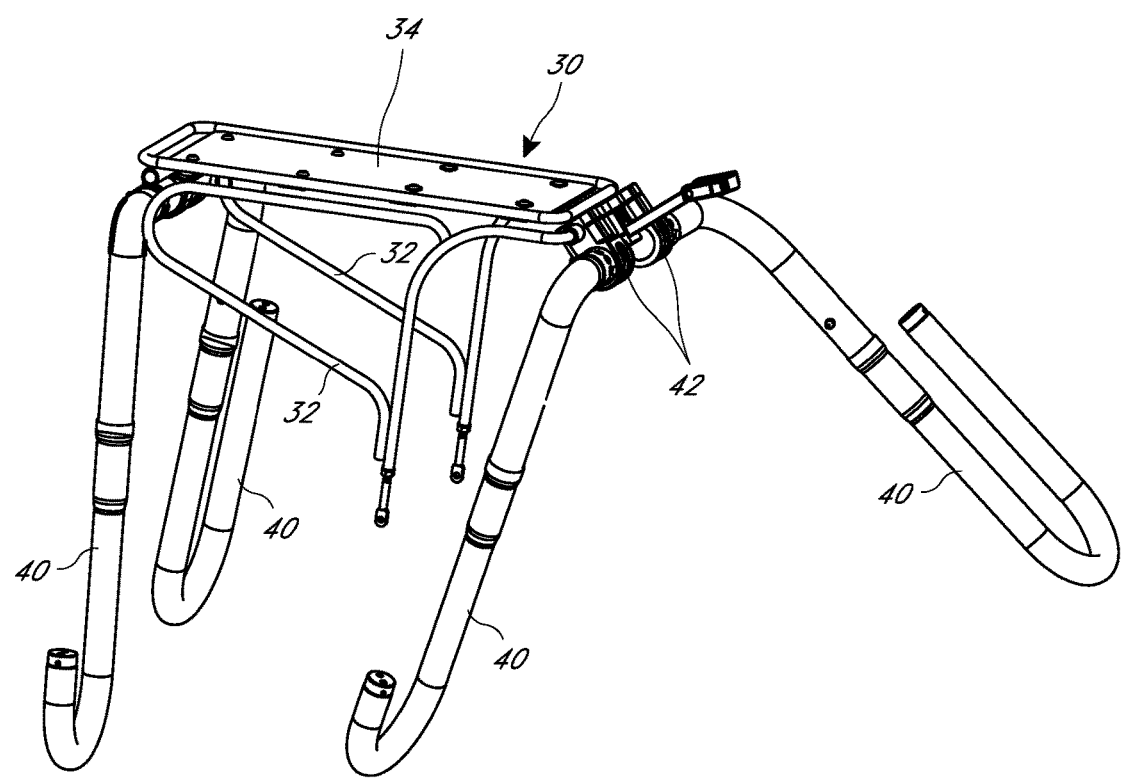
FIG. 7 is another perspective view of the rack of FIG. 5.
Figure 8:
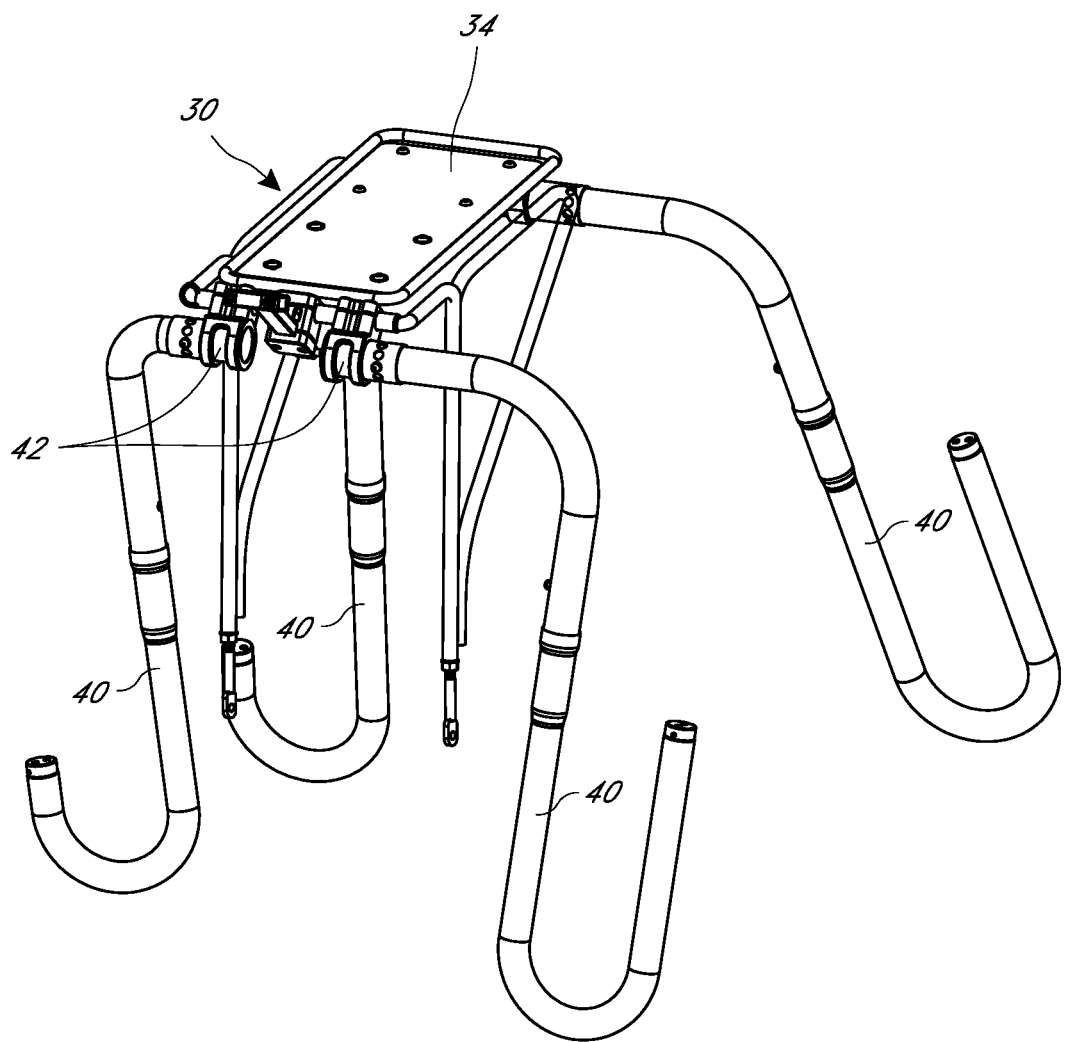
FIG. 8 is a perspective view of the rack of FIG. 5 as viewed from the front.

With reference to FIGS. 1-8, a bicycle 10 has a frame 12, a front wheel 14, a rear wheel 16, a handlebar 18 and a seat or saddle 20. The bicycle 10 includes a rack 22, which can be a separate structure from or an integrated structure with the bicycle 10. The rack 22 can include a board carrying portion suitable for carrying boards, board-like objects or other somewhat elongate and/or somewhat thin objects, such as surfboards 24 and beach chairs 26. In some configurations, the rack 22 can support an umbrella 28.

The rack 22 comprises a rack body 30 configured to be supported above the rear wheel 16 of the bicycle 10. The rack body 30 can be supported by side portions, struts or frames 32 that extend generally vertically along and straddle the rear wheel 16. A lower end of each of the side portions 32 is coupled to the bicycle frame 12, such as to a fender or rack mounting tab of the bicycle frame 12. However, other mounting arrangements can also be used, such as an axle mount arrangement, as described below. In some configurations, the side portions 32 can be integrated (e.g., welded) with the bicycle frame 12.

The rack 22 can comprise a deck portion 34 that extends in a longitudinal direction of the bicycle 10 above the rear wheel 16. The deck portion 34 can be a generally planar structure and can have a length that is equal to or greater than at least one-half of a diameter of the rear wheel 16 of the bicycle 10. The length of the deck portion 34 can be approximately the same as the diameter of the rear wheel 16. The deck portion 34 can have a relatively narrow width that can be greater than the width of the rear wheel 16, but less than about 12 inches or less than about 8 inches.

One or more carrier arms 40 can be coupled to the rack 22 at forward and/or rearward ends. In some configurations, a carrier arm 40 can be provided on each side of the front and each side of the rear of the rack 22. One or more of the carrier arms 40 can be rotatable or otherwise adjustable with respect to the rack body 30, such as by one or more rotational clamp(s) 42. In some configurations, a rotational clamp 42 is provided for each carrier arm 40 such that each is independently adjustable. In some configurations, the rotational clamp 42 can support two or more of the carrier arms 40, but can permit separate adjustment of two or more of the carrier arms 40. That is, it is not necessary to have separate rotational clamps 42 for each carrier arm 40 in order to provide for separate adjustment. This feature allows a distance and/or a height between front and rear carrier arms 40 to be adjusted. In some configurations, some (e.g., the front) carrier arms 40 can be adjustable and some (e.g., the rear) can be fixed, or vice versa.

In some configurations, the carrier arms 40 comprise a carrier portion or object support, which in some cases can be a cradle. However, in other arrangements, the carrier portion can take on other shapes suitable for carrying other objects. For example, the carrier portion could be a platform, a box or other receptacle, or any other suitable arrangement. In the illustrated arrangement, the cradle comprises a U-shaped portion 44, which allows boards or board-like objects (e.g., surfboards, stand-up paddle boards, skateboards, folding beach chairs, etc.) to be carried. The cradle or U-shaped portion 44 can have any suitable depth or width to carry the desired objects. The U-shaped portions 44 can be removable or adjustable, if desired. For example, in the illustrated arrangement, the U-shaped portions 44 are connected to upper portions of the carrier arms 40 by a push-pin and hole connection (a "pop-pin" connection) such that the U-shaped portions 44 can be removed easily and quickly without the use of tools. In some configurations, the U-shaped portions 44 can have multiple adjustment positions relative to the upper portions of the carrier arms 40 (e.g., multiple holes that can receive the pop-pins) such that the length of the carrier arms 40 or height of the U-shaped portions 44 can be adjusted. Other suitable adjustment arrangements can also be used.

The U-shaped portions 44 can all be the same size and shape or can vary in size and/or shape. For example, the U-shaped portions 44 on one side of the bicycle 10 can have longer return portions 46 compared to the U-shaped portions 44 on the other side of the bicycle 10, which can facilitate the carrying of different types of cargo between the two sides of the bicycle 10. Similarly, the widths defined by the U-shaped portions 44 can vary. In some configurations, the widths defined by the U-shaped portions 44 are different on one side of the bicycle 10 compared to the widths defined by the U-shaped portions 44 on the other side of the bicycle 10. In some configurations, the lengths of the return portions 46 and/or the widths defined by the U-shaped portions 44 are the same on one side of the bicycle 10. That is, the forward and rearward U-shaped portions 44 on one side of the bicycle 10 define the same width and/or have the same length return portions 46 as one another, which can be the same or different from the corresponding dimensions of the U-shaped portions 44 on the other side of the bicycle 10.

In some configurations, the rack 22 can support an umbrella holder 50 or an integrated umbrella. The umbrella holder 50 can be supported on the deck 34 of the rack 22 and secured by a suitable fastening mechanism, such as screws or bolts. The umbrella holder 50 can receive a shaft or pole of the umbrella 28 and can include a clamping mechanism, set screw or other mechanism for fixing the umbrella 28 to the holder 50. The umbrella holder 50 can be rearwardly canted to hold the shaft or pole of the umbrella 28 at a rearward angle. The umbrella 28 shade portion can be elongate such that the length is greater than the width. The shade portion of the umbrella 28 can extend from the handlebars 18 of the bicycle 10 to at least a location vertically above the rear wheel 16. In some configurations, the shade portion of the umbrella 28 can extend to or beyond a rearward-most point of the rear wheel 16. The shade portion can be of any suitable construction and/or material, such as fabric supported (e.g., stretched) on a frame structure or a formed unitary structure, among other possibilities. In at least some configurations, the shade portion of the umbrella 28 can be collapsible.

In some configurations, the forward end of the rack 22 can be coupled to the seat post, seat tube or other portion of the bicycle frame 12 by an adjustable connector 60. The adjustable connector 60 can be rotatable relative to the forward end of the rack 22. The adjustable connector 60 can have a clamp 62 that is rotatable relative to a main body or arm portion 64 of the adjustable connector 60. With such an arrangement, the adjustable connector 60 can be fit to a wide variety of bicycle types, sizes or geometries as a result of both the arm portion 64 and the clamp 62 being rotatable relative to the rack 22 or one another. The arm portion 64 can be secured to the rack 22 between the rotational clamps 42 and/or by any suitable arrangement, such as a clamp. Other suitable arrangements can also be used, such as arms that extend to and are connectable to rack mounts of the bicycle frame 12.

Figure 9:
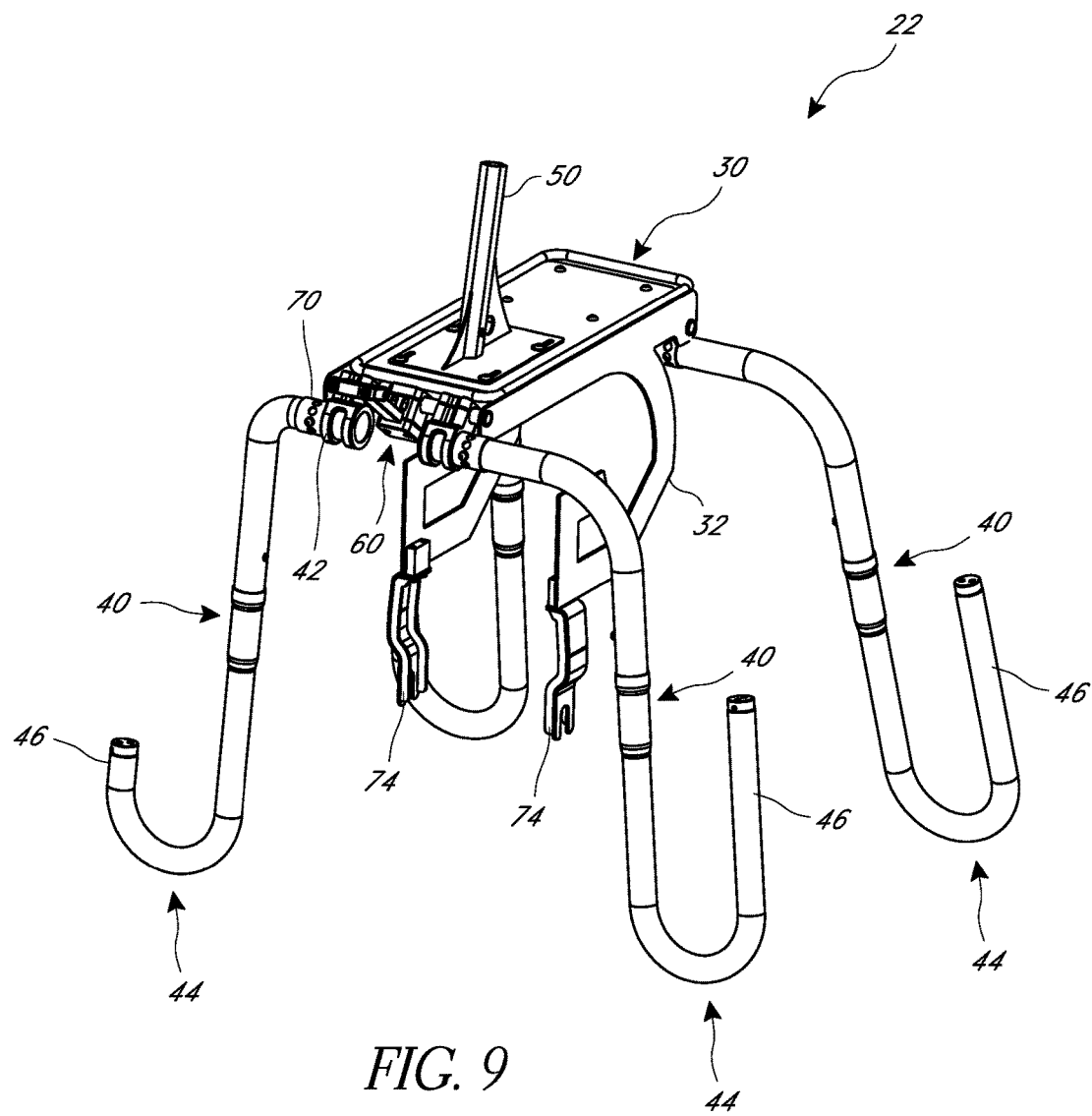
FIG. 9 is a side and top perspective view of a bicycle rack having certain features, aspects and advantages of the preferred embodiments.
Figure 10:
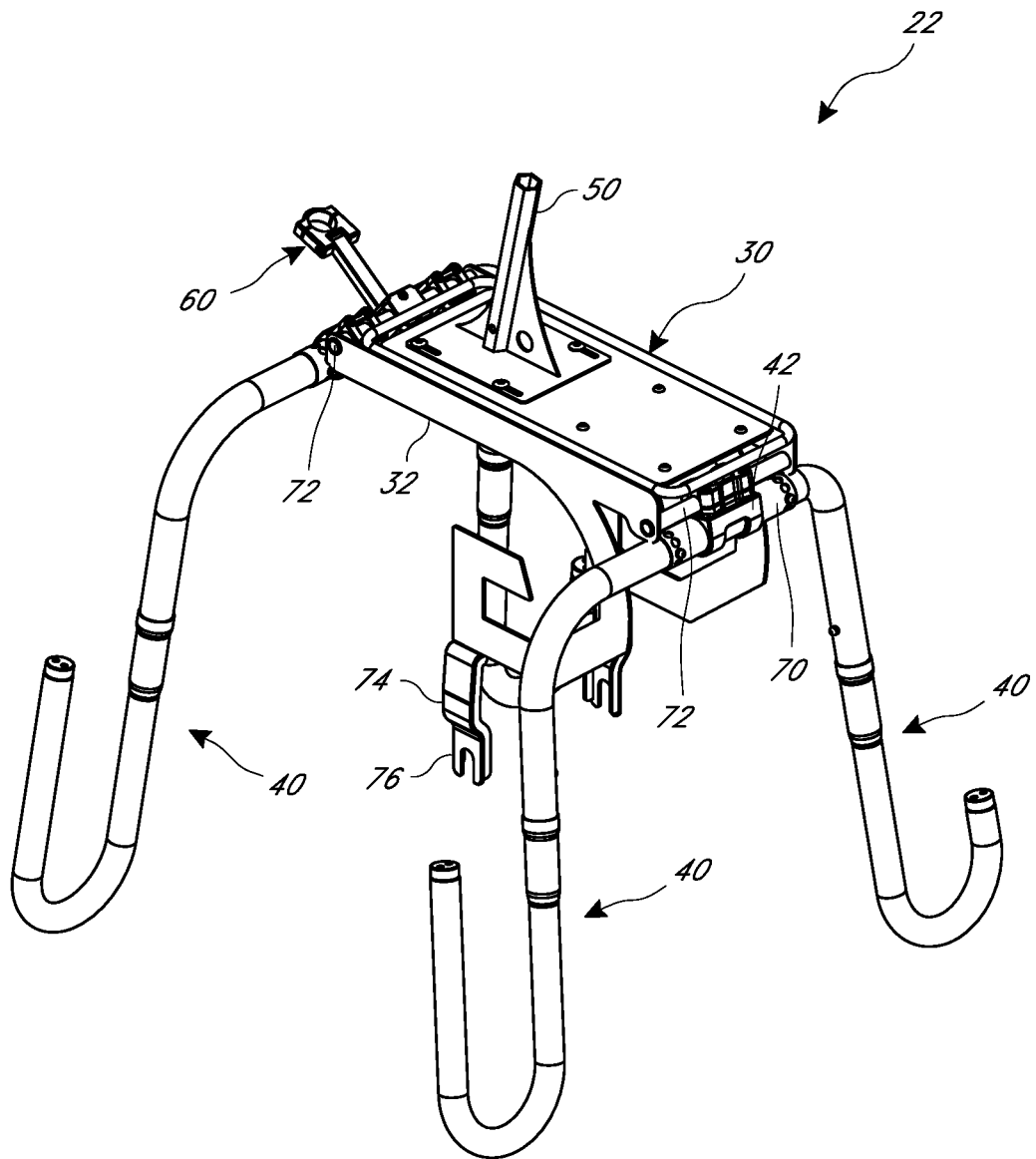
FIG. 10 is a side, rear and top perspective view of the bicycle rack of FIG. 9.
Figure 11:
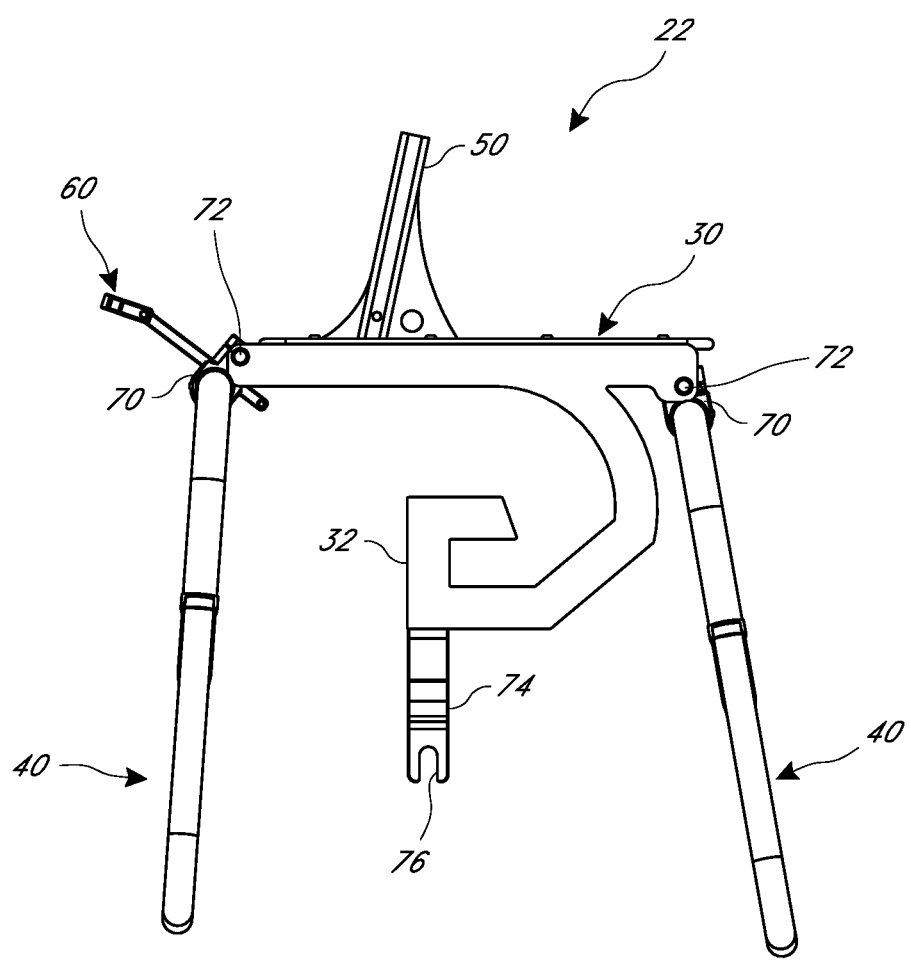
FIG. 11 is a side view of the rack of FIG. 9.
Figure 12:
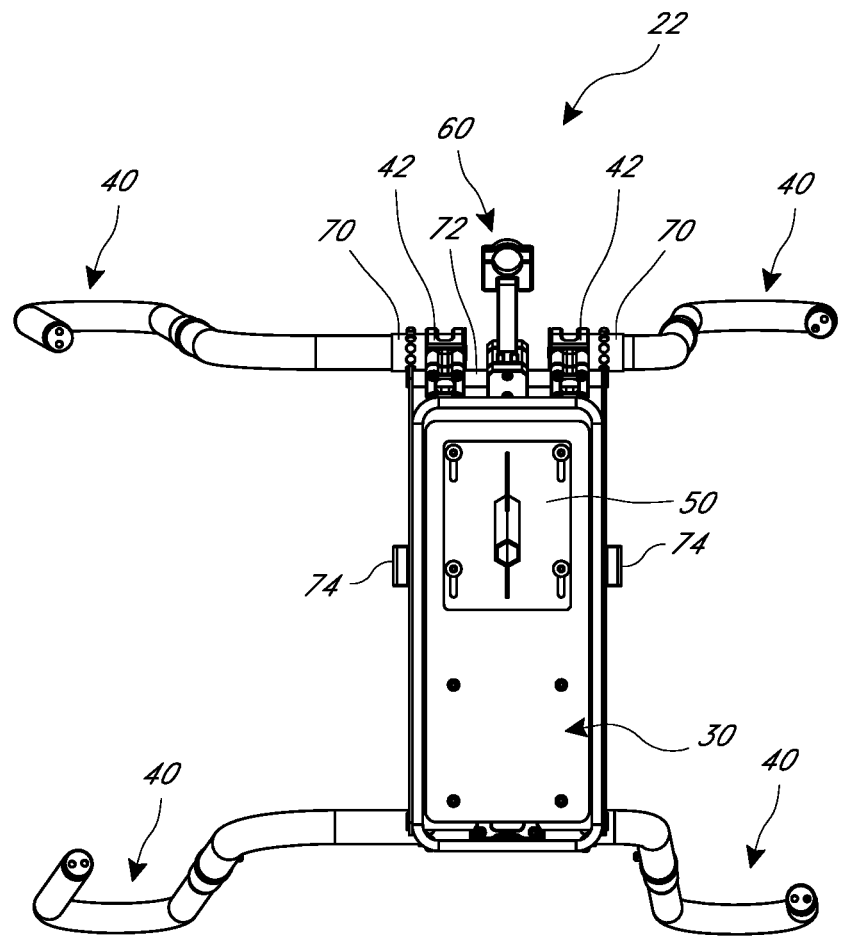
FIG. 12 is a top view of the rack of FIG. 9.

FIGS. 9-12 illustrate another embodiment of the rack 22, which is similar in many respects to the rack 22 of FIGS. 1-8. Accordingly, the same reference numbers refer to the same or corresponding components or features between the two racks 22. In addition, the description of the rack 22 of FIGS. 9-12 is focused on the differences relative to the rack 22 of FIGS. 1-8. Accordingly, any features or components not specifically discussed can be the same as or similar to the corresponding feature or component of the rack 22 of FIGS. 1-8 or can be of another suitable arrangement.

The rack 22 of FIGS. 9-12 includes a single clamp 42 that couples the rear carrier arms 40 to the main body 30 of the rack 22. In particular, the arrangement comprises a tubular connector portion 70 that is secured to the rack body 30 by the clamp 42. The carrier arms 40 can be supported by opposing ends of the connector portion 70. In some arrangements the carrier arms 40 can be fixed relative to the connector portion 70; however, in the illustrated arrangement one or both of the carrier arms 40 are rotatably adjustable relative to the connector portion 70. Any suitable adjustment arrangement can be used, such as a clamp arrangement between the connector portion 70 and the carrier arms 40. In the illustrated arrangement, a pop-pin connection is provided between the connector portion 70 and the carrier arms 40. The illustrated pop-pin connection provides for angular adjustment between a plurality of possible angular positions; however, the pop-pin connection could also provide for a single fixed angular position.

In the illustrated arrangement, the forward carrier arms 40 each have a clamp 42 that connects the respective carrier arm 40 to the rack body 30. The clamps 42 are positioned on opposing sides of the adjustable connector 60. In the illustrated arrangement, each clamp 42 supports an individual tubular connector portion 70 that is similar to the rear connection portion 70. The forward tubular connector portions 70 can support the respective carrier arm 40 in a fixed or adjustable manner by a pop-pin connection similar to the rear carrier arms 40 or another suitable arrangement.

The rack body 30 can include a forward and a rearward support 72, each of which can be in the form of a support bar. The support bars 72 can extend in a widthwise direction between the side portions 32 of the rack 22. The support bars 72 can be connected to each of the side portions 32. The support bars 72 provide for connection of the clamps 42 to the rack body 30 by any suitable arrangement, such as a clamping arrangement. The side portions 32 can comprise thin, planar elements. The side portions 32 in some arrangements can be cut from a plate of material to form the shape of a "G," for example (at least when viewed from one side). The side portions 32 can be secured to the bicycle 10 by any suitable arrangement.

In some configurations, the side portions 32 are connected to a rear axle of the rear wheel 16 of the bicycle 10. In the illustrated arrangement, the side portions 32 are connected to the axle by mounting brackets 74 that extend downwardly from the side portions 32. Each of the brackets 74 has a receptacle or slot 76 that receives the axle of the bicycle rear wheel 16. In the illustrated arrangement, each of the brackets 74 defines a C-shape in cross-section to provide rigidity while allowing a relatively thin material to be used.

Figure 13:
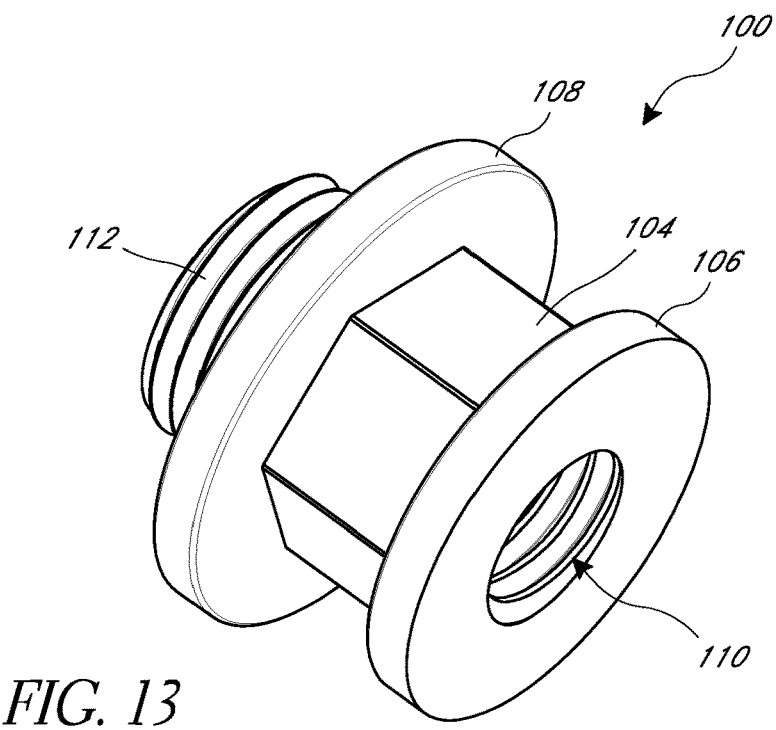
FIG. 13 is a perspective view of a replacement axle nut.
Figure 14:
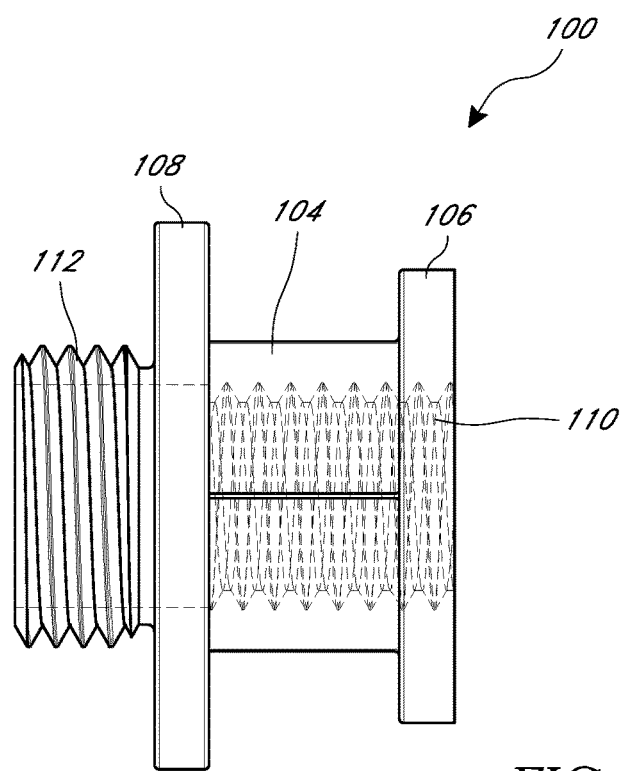
FIG. 14 is a side view of the replacement axle nut of FIG. 13.

The brackets 74 can be secured to the axle of the rear wheel 16 by any suitable arrangement. In some configurations, the brackets 74 are secured to the axle with the nuts or other fasteners used to secure the rear wheel 16 to the bicycle 10. However, in other configurations, the axle may not be long enough to accommodate the brackets 74. FIGS. 13-17 illustrate a replacement axle nut 100 and an axle cap 102 that can be used together to secure each of the brackets 74 to the axle of the rear wheel 16. In particular, the axle nut 100 can replace the original axle nut on the bicycle 10 and the bracket 74 can be captured between the axle nut 100 and the axle cap 102. This arrangement can be used on each side of the axle of the rear wheel 16 to secure each bracket 74 to the bicycle 10.

The axle nut 100 includes a tool engagement portion 104 that extends between a first flange 106 and a second flange 108. The first flange 106 is configured to face the bicycle frame 12 and the second flange 108 is configured to face away from the frame 12. The axle nut 100 includes an internal threaded cavity 110 that passes axially through a portion or an entirety of the nut 100. The internally-threaded cavity 100 receives the axle of the bicycle rear wheel 16 and allows the nut 100 to secure the rear wheel 16 to the bicycle frame 12. The tool engagement portion 104 can allow a tool to engage and rotate the nut 100 for tightening or loosening the nut 100.

The nut 100 also includes an externally-threaded extension 112 that extends from the second flange 108 along the axis of the nut 100 in a direction away from the tool engagement portion 104 and first flange 106. The extension 112 is configured to threadably receive the rear axle cap 102. The cap 102 includes an internally-threaded cavity 114 that extends in an axial direction of the cap 102 and is configured to mate with the extension 112. The cap 102 also includes a tool engagement portion (e.g., a tool engagement cavity) 116 that permits the cap 102 to be assembled to and disassembled from the axle nut 100. The cap 102 can be assembled to the extension 112 and can capture the bracket 74 between the cap 102 and the second flange 108.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle rack, comprising:
 a rack body configured to be supported above a wheel of the bicycle and comprising an upper horizontal support portion that is configured to extend in a longitudinal direction of the bicycle above the wheel; and
 a pair of side portions that are configured to extend along and straddle opposite sides of the wheel of the bicycle, wherein each of the pair of side portions are coupled to the bicycle;
 wherein each of the side portions is connectable to an axle of the wheel of the bicycle by a bracket, further comprising an axle nut and an end cap, wherein the end cap is directly connectable to the axle nut to capture the bracket between the axle nut and the end cap.

2. The bicycle rack of claim 1, wherein the rack body supports an umbrella holder.

3. The bicycle rack of claim 2, wherein the umbrella holder is supported on an upper surface of the deck.

4. The bicycle rack of claim 1, wherein the rack body supports an umbrella.

5. The bicycle rack of claim 1, further comprising an adjustable connector configured to connect a forward end of the rack body to a seat post, a seat tube or another portion of the bicycle.

6. The bicycle rack of claim 5, wherein the adjustable connector is rotatable relative to the forward end of the rack body.

7. The bicycle rack of claim 1, wherein the axle nut comprises an internal threaded cavity, a tool engagement portion and an external threaded extension, which extends from an opposite side of a flange relative to the tool engagement portion, wherein the end cap is configured to engage the external threaded extension of the axle nut such that the bracket is captured between the end cap and the flange.

8. The bicycle rack of claim 1, further comprising a first set of carrier arms coupled to a side of the rack body and a second set of carrier arms coupled to an opposite side of the rack body, wherein at least one of each of the first set of carrier arms and the second set of carrier arms is adjustable relative to the rack body.

9. The bicycle rack of claim 8, wherein each of the first set and the second set of carrier arms comprises an individual carrier arm at each of a forward end and a rearward end of the rack body.

10. The bicycle rack of claim 8, wherein the adjustable carrier arms are rotatable with respect to the rack body.

11. The bicycle rack of claim 10, wherein the adjustable carrier arms are movable between a plurality of discrete adjustment positions.

12. The bicycle rack of claim 11, wherein the adjustable carrier arms are movable between the plurality of discrete adjustment positions without the use of tools.

13. The bicycle rack of claim 8, wherein each of the individual carrier arms of at least one of the first and second set of carrier arms comprise a U-shaped cradle.

14. A bicycle, comprising:
a bicycle frame supporting a front wheel and a rear wheel;
a handlebar configured to steer the front wheel;
a seat;
a rack body configured to be supported above the rear wheel of the bicycle and comprising a deck portion that is configured to extend in a longitudinal direction of the bicycle above the rear wheel; and
a pair of side portions that are configured to extend along and straddle opposite sides of the rear wheel of the bicycle, wherein each of the pair of side portions are coupled to the bicycle;
wherein each of the side portions is connectable to an axle of the wheel of the bicycle by a bracket, further comprising an axle nut and an end cap, wherein the end cap is directly connectable to the axle nut to capture the bracket between the axle nut and the end cap.

15. The bicycle of claim 14, wherein the rack body supports an umbrella.

16. The bicycle of claim 15, wherein the umbrella is configured to extend from the handlebar to a location vertically above the rear wheel of the bicycle.

17. The bicycle of claim 14, further comprising an adjustable connector configured to connect a forward end of the rack body to a seat post, a seat tube or another portion of the bicycle.

18. The bicycle of claim 14, wherein the axle nut comprises an internal threaded cavity, a tool engagement portion and an external threaded extension, which extends from an opposite side of a flange relative to the tool engagement portion, wherein the end cap is configured to engage the external threaded extension of the axle nut such that the bracket is captured between the end cap and the flange.

19. The bicycle of claim 14, further comprising a first set of carrier arms coupled to a side of the rack body and a second set of carrier arms coupled to an opposite side of the rack body, wherein at least one of each of the first set of carrier arms and the second set of carrier arms is adjustable relative to the rack body.

20. The bicycle of claim 19, wherein the adjustable carrier arms are rotatable with respect to the rack body.

21. The bicycle of claim 20, wherein the adjustable carrier arms are movable between a plurality of discrete adjustment positions.

22. The bicycle of claim 19, wherein each of the individual carrier arms of at least one of the first and second set of carrier arms comprise a U-shaped cradle.

* * * * *